(12) United States Patent
Zethraeus

(10) Patent No.: US 12,466,266 B2
(45) Date of Patent: Nov. 11, 2025

(54) CONTACT MEMBER FOR COLLECTING POWER FROM AN ELECTRIC ROAD TRACK

(71) Applicant: ELONROAD AB, Lund (SE)

(72) Inventor: Dan Zethraeus, Lund (SE)

(73) Assignee: ELONROAD AB, Lund (SE)

( * ) Notice: Subject to any disclaimer, the term of this patent is extended or adjusted under 35 U.S.C. 154(b) by 322 days.

(21) Appl. No.: 18/000,293

(22) PCT Filed: May 31, 2021

(86) PCT No.: PCT/EP2021/064526
§ 371 (c)(1),
(2) Date: Nov. 30, 2022

(87) PCT Pub. No.: WO2021/245017
PCT Pub. Date: Dec. 9, 2021

(65) Prior Publication Data
US 2023/0202304 A1    Jun. 29, 2023

(30) Foreign Application Priority Data

Jun. 1, 2020 (SE) .................................. 2050626-7

(51) Int. Cl.
*B60L 5/36* (2006.01)
*B60L 53/14* (2019.01)

(52) U.S. Cl.
CPC ................ *B60L 5/36* (2013.01); *B60L 53/14* (2019.02)

(58) Field of Classification Search
CPC .................................. B60L 5/36; B60L 53/14
USPC ....................................................... 180/65.31
See application file for complete search history.

(56) References Cited

U.S. PATENT DOCUMENTS

| 4,476,947 | A | * | 10/1984 | Rynbrandt | B60L 50/53 180/2.1 |
| 5,464,082 | A | * | 11/1995 | Young | B60L 9/00 191/23 R |
| 6,230,861 | B1 | * | 5/2001 | Cornic | B60M 1/10 191/23 R |
| 6,382,378 | B1 | * | 5/2002 | Cornic | B60M 1/10 191/20 |
| 8,418,824 | B2 | * | 4/2013 | Aguilar | B60L 5/36 191/47 |

(Continued)

FOREIGN PATENT DOCUMENTS

| CN | 201294274 Y | 8/2009 |
| CN | 205429370 U | 8/2016 |

(Continued)

OTHER PUBLICATIONS

Office Action from Chinese Application No. 202180039126.8 mailed Aug. 15, 2024, 12 pages.

(Continued)

*Primary Examiner* — Hau V Phan
(74) *Attorney, Agent, or Firm* — Shih IP Law Group, PLLC

(57) ABSTRACT

A contact member for a power collector of an electric road vehicle, the contact member being configured to be mounted to a first end of an arm of the power collector, the contact member comprising: a support structure; a conductive pick up comprising a braided strip, the conductive pick up being mounted to the support structure.

19 Claims, 3 Drawing Sheets

(56) References Cited

U.S. PATENT DOCUMENTS

| | | | | |
|---|---|---|---|---|
| 8,807,308 | B2* | 8/2014 | Suh | B60L 50/51 |
| | | | | 191/4 |
| 8,833,533 | B2* | 9/2014 | Suh | B60L 53/14 |
| | | | | 191/10 |
| 9,796,272 | B2* | 10/2017 | Richards | B60M 7/003 |
| 10,647,220 | B2* | 5/2020 | Duprat | B60L 53/36 |
| 2011/0017531 | A1* | 1/2011 | Re Fiorentin | B60L 5/42 |
| | | | | 191/13 |
| 2013/0037367 | A1 | 2/2013 | Aguilar | |
| 2018/0304752 | A1* | 10/2018 | Duprat | B60L 5/04 |
| 2019/0263267 | A1* | 8/2019 | Öhman | B60L 5/04 |
| 2020/0009976 | A1* | 1/2020 | Öhman | B60L 53/35 |

FOREIGN PATENT DOCUMENTS

| | | | |
|---|---|---|---|
| CN | 110936638 | A | 3/2020 |
| EP | 1491385 | A1 | 12/2004 |
| EP | 2345554 | A2 | 7/2011 |
| JP | H06315202 | A | 11/1994 |
| JP | 2000037001 | A | 2/2000 |
| JP | 2012212531 | A | 11/2012 |
| JP | 2019537917 | A | 12/2019 |
| WO | 2018/086689 | A1 | 5/2018 |

OTHER PUBLICATIONS

CN Office Action from CN Application No. 202180039126.8 mailed May 16, 2024, 10 pages.

Partial Translation of the Relevant Portion of the Notification of Reason for Rejection from JP Application No. 2022-573755 mailed Sep. 3, 2024, 3 pages.

International Search Report of PCT/EP2021/064526 dated Sep. 10, 2021.

* cited by examiner

CONTACT MEMBER FOR COLLECTING POWER FROM AN ELECTRIC ROAD TRACK

CROSS-REFERENCE TO RELATED APPLICATION

This Application is the National Stage filing under 35 U.S.C. § 371 of PCT Application Ser. No. PCT/EP2021/064526 filed on May 31, 2021, which claims the benefit of Swedish Patent Application No. 2050626-7 filed on Jun. 1, 2020. The disclosure of which is hereby incorporated herein by reference.

FIELD OF THE INVENTION

The present invention relates to provision of electric power to an electric vehicle, more specifically to a contact member for a power collector of an electric road vehicle, a power collector for an electric vehicle and to an electric vehicle comprising a power collector.

BACKGROUND ART

Electric vehicles are becoming more and more common as vehicles powered by conventional fuels are gradually being phased out. Electric vehicles generally provide benefits in terms of reducing the environmental impact of the travelling and logistics associated therewith. However, shifting the road-bound transportation of both people and goods from being performed by vehicles driven with conventional fossil-based fuels to electrically powered vehicles places great demands on the infrastructure for providing electric power to the vehicles.

The number of charging stations available to charge electric vehicles are increasing. However, charging an electric vehicle at a charging station is relatively time-consuming and may not be a viable option for instance for freight vehicles. One alternative or complement to charging stations that has emerged is electric road tracks which allows provision of electric power to the vehicle as it is moving. This provides the benefits of for instance allowing a reduction in the battery size of the vehicle, of reducing the need to stop at charging stations to recharge the batteries and of improving the range of the electric vehicle.

Conductive electric power transfer from the electric road track to the electric vehicle requires that a power collector of the vehicle is arranged in contact with the electric road track for establishing electric connection therewith. The relative movement between the power collector and the electric road track and the friction between the two however causes certain problems with wear. Manufacturers of devices for providing electric power to vehicles from electric road tracks thus constantly strive to improve the reliability and durability of the interface between the electric road track and the electric vehicle.

SUMMARY OF THE INVENTION

In view of that stated above, the object of the present invention is to provide a contact member, a power collector and a vehicle comprising a power collector that alleviates some of the problems with prior art solutions.

More specifically, there is provided according to the teachings herein a contact member for a power collector of an electric road vehicle. The contact member being configured to be mounted to a first end of an arm of the power collector. The contact member comprising:
a support structure;
a conductive pick up comprising a braided strip, the conductive pick up being mounted to the support structure, the conductive pick up being configured to establish contact with an electric road track for conductively picking up electrical power from said electric road track. The conductive pick up of the contact member in the present disclosure facilitates provision of improved durability and high conductive electric power transfer between the electric road track and the contact member.

The braided strip may have an extension in a transverse direction in relation to the electric road track from which the conductive pick up is configured to conductively pick up electric power, facilitating controlling that the conductive contact between the contact member and the electric road track is maintained when the vehicle moves along the electric road track. Some of the eventual deviations of the vehicle from the path defined by the extension of the electric road track can thus be compensated by the transverse extension of the braided strip.

The conductive pick up may comprise a laminate of a plurality of braided strips. The laminate may comprise between 1 to 14 braided strips arranged in the laminate.

A first braided strip of the braided strips in the laminate may be made from a first conductive material and a second braided strip of the braided strips in the laminate may be made from a second conductive material. The first conductive material may be copper, while the second conductive material may be stainless steel. Having braided strips arranged in the laminate made from different conductive materials is beneficial in terms of improving the wear resistance of the contact member, while maintaining a desired electrically conductive property thereof. The braided strips may thus further be alternatingly arranged. The alternating arrangement of first braided strips and second braided strips provides a contact member that provides a sufficiently low electrical resistance and thus high conductivity, while having high durability and improved wear resistance.

Layers of the laminate may be arranged offset relative each other in a parallel direction to the electric road track from which the conductive pick up is configured to conductively pick up electric power, each layer of the laminate may comprise one of the plurality of braided strips. The offset arrangement of the layers of the laminate, each layer preferably comprising a braided strip, facilitates contact between each of the layers with the electric road track. The wear is thus distributed to each of the layers of the laminate, while the surface area of the contact between the contact member and the electric road track is increased.

Threads in the braided strip of the conductive pick up may comprise a composite material comprising a metal and graphene, the metal/graphene composite material providing high conductivity as well as high wear resistance and low weight.

The braided strip of the conductive pick up may comprise threads made from a first conductive material and threads from a second conductive material. Having threads of different conductive materials braided/intertwined to form the braided strip facilitates tailoring the desired properties of the braided strip.

The first conductive material may comprise stainless steel and the second conductive material may comprise one or more of copper and aluminum.

A first braided strip may be arranged outermost of the plurality of braided strips. The first braided strip being made from a conductive material comprising stainless steel, which provides high wear resistance and durability. The outermost braided strip is the strip that is arranged first in relation to the direction of travel of the vehicle, i.e. the braided strip that will first encounter any debris such as dirt, small rocks etc. that might be present on the electric road track. Providing the conductive pick up with an outermost arranged first braided strip that is highly durable facilitates provision of a contact member that will wear evenly and in which the overall durability is improved.

The support structure may comprise a resilient member and the conductive pick up may be mounted to the resilient member. The resilient member facilitates establishing an even contact pressure over the electric road track by the conductive pick up. The wear can thus be more evenly distributed over the conductive pick up and the electrical conduction be improved as the contact area increases.

The resilient member may be made out of spring. The spring steel may comprise steel and/or stainless steel.

The resilient member may comprise a plurality of tongues, the conductive pick up may be mounted to distal ends of the plurality of tongues. The tongues may be resiliently moved independently of each other and thus allows the conductive pick up to adapt to the shape of the electric road track. The force from the conductive pick up onto the electric road track is thus evened out over the entire contact which reduces and distributes wear while providing good electrical conduction as a result of the large surface area of the contact.

A thickness of the conductive pick up may be in the range of 2 mm to 70 mm.

A thickness of each layer in the laminate may be in the range of 1 mm to 10 mm.

A height of the conductive pick up may be in the range of 10 mm to 70 mm.

The contact member may further comprise releasable mounting elements configured to releasably mount the braided strip to the support structure. The braided strip may thus be easily replaced, for instance when worn.

In a second aspect is a power collector provided comprising a contact member according to the first aspect.

In a third aspect is an electric road vehicle provided comprising a power collector according to the second aspect, the power collector is mounted to a chassis of the electric road vehicle.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
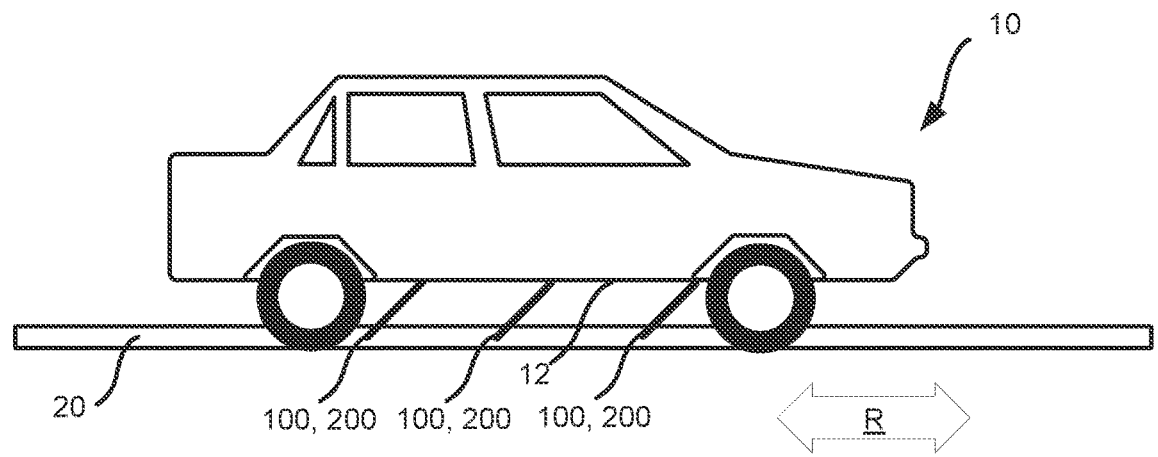
FIG. 1 discloses a side view of a vehicle comprising a power collector.

FIG. 1 discloses an electric vehicle 10. The vehicle 10 is illustrated as a car, however the teachings herein could be applied to other vehicles as well such as trucks, busses etc. The vehicle 10 is travelling on a road being provided with an electric road track 20, the electric road track 20 being configured for conductively providing electric power to the vehicle 10.

The vehicle 10 is provided with a power collector 200 according to the teachings herein being mounted to a chassis 12 of the vehicle 10. The power collector 200 may however be mounted elsewhere on the vehicle 10 as well, i.e. not directly to the chassis 12.

The vehicle 10 is shown being provided with three power collectors 200, however any number of power collectors 200 could be fitted to the vehicle 10. The vehicle 10 is travelling in a forward direction along the longitudinal direction R of the electric road track 20 while the power collectors 200, each comprising a contact member 100 configured for contact with the electric road track 20, slides against the electric road track 20 and conductively provides electric power to the vehicle 10.

Figure 2:
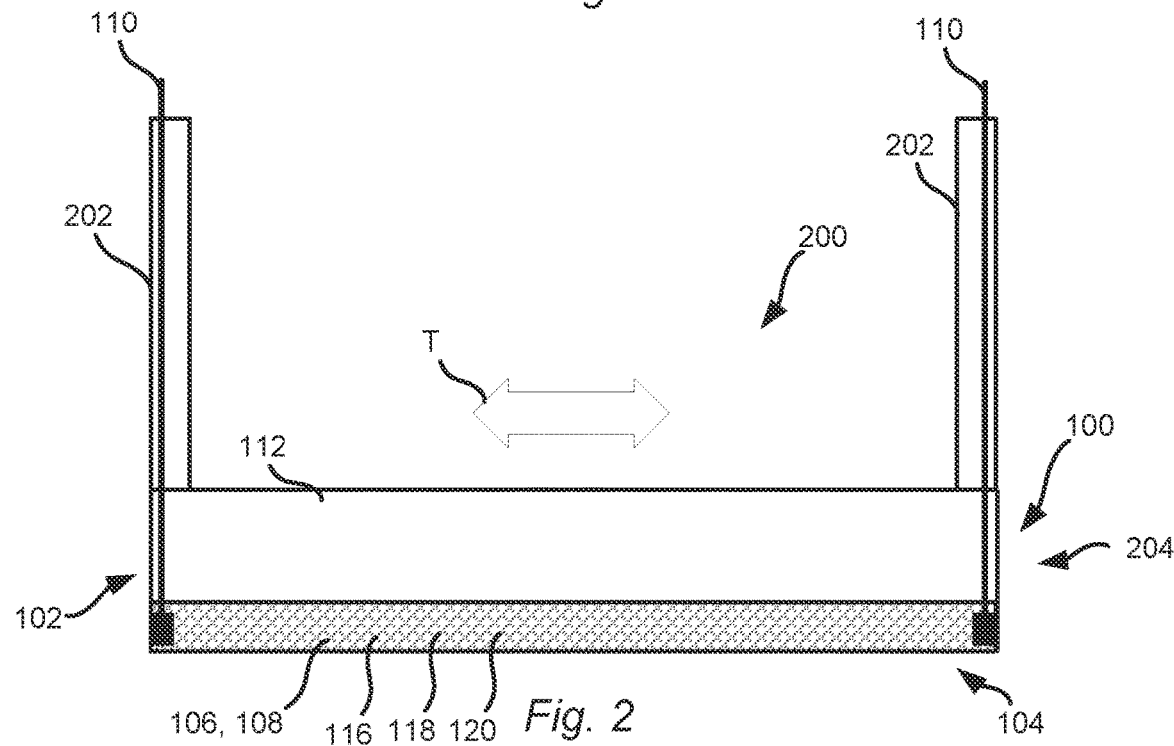
FIG. 2 discloses a front view of a power collector.

FIG. 2 shows a power collector 200 from a front view, i.e. from the side of the power collector 200 that is to be arranged facing the electric road track 20 and in the direction in which the vehicle 10 is moving. The power collector 200 comprises a contact member 100, configured to be mounted to a first end 204 of an arm 202 of the power collector 200. The embodiment shown in FIG. 2 comprises two arms 202 between which the contact member 100 extends in a transverse direction T in relation to the electric road track 20. The arms 202 may be pivotable in relation to the vehicle 10 to which the power collector 200 is attached such that the contact member 100 may be raised and lowered depending on if the vehicle 10 is travelling over an electric road track 20 or not.

The contact member 100 is configured to conductively be in contact with the electric road track 20 as the vehicle 10 moves along the track 20. The contact member 100 will thus be subjected to friction and wear caused by the interaction with the electric road track 20. The contact member 100 should preferably facilitate achieving a large contact area between the electric road track 20, particularly a contact line (not show) thereof, and the contact member 100 to facilitate conduction with low resistance for the electric power transfer. These two factors to some extent are in conflict with each other as to achieve a large contact area, the contact member 100 must be pushed towards the electric road track 20 with some degree of force which inevitably causes increased friction and increased wear.

The contact member 100 disclosed herein comprises a support structure 102. The support structure 102 is configured to support a conductive pick up 104 mounted thereto, the conductive pick up 104 is in turn configured to be the portion of the contact member 100 that is arranged in contact with the electric road track 20 drawing electric power therefrom. The conductive pick up 104 is thus connected to the vehicle 10, specifically to an electric system thereof, for instance via one or several electrically conductive elements such as a an electrically conducting wire or similar. The transmission and provision of the electric power from the power collector 200 to the batteries of the vehicle 10 can be achieved in a number of ways as is realized by a person skilled in the art and is of no particular importance to the teachings herein. It will thus not be elaborated further on in this disclosure.

The conductive pick up 104 comprises a braided strip 106, 108. The braided strip 106, 108 allows provision of the pick up 104 with the required flexibility while facilitating provision of a sufficiently high wear resistance. The braided strip 106, 108, and/or the conductive pick up 104, may further be mounted to the support structure 102 releasably such that the braided strip 106, 108 can be replaced when worn. Preferably, ends of the braided strip 106, 108 are connected to the vehicle 10, specifically to an electric system thereof, for instance directly or indirectly via one or several electrically conductive elements 110 such as a one or several electrically conducting wires or similar.

The braided strip 106, 108 may further, as visualized in FIG. 2, be configured to extend essentially in a transverse direction T in relation to the longitudinal direction R of the electric road track 20. This provides some room for the vehicle 10 to maneuver transversely when travelling along the electric road track 20 while the conductive pick up 104 still maintains contact therewith. Further still, as it is natural that the vehicle 10 while moving along the electric road track 20 to some extent deviates from the longitudinal direction R of the extension of the electric road track 20, the extension of the conductive pick up 104 in the transverse direction T facilitates provision of a larger surface on the pick up 104 over which wear is distributed, thus providing increased durability.

The braided strip 106, 108 of the conductive pick up 104 may further comprise a first plurality of threads 116 made from a first conductive material and a second plurality of threads 118 from a second conductive material. The first plurality of threads 116 of the first conductive material and the second plurality of threads 118 of the second conductive material may be braided such that the two types of threads 116, 118 are intertwined. The first conductive material may be copper and/or aluminum, and/or a respective alloy comprising copper and/or aluminum while the second conductive material is stainless steel. Copper and aluminum provide high conductivity while having less wear resistance while the opposite is true for stainless steel. The combination of the two types of threads 116, 118 in a braided fashion provides not only the desired conductivity but also the desired durability.

In one embodiment, threads 120 in the braided strip 106, 108 of the conductive pick up 104 comprises a composite material comprising a metal and graphene. The metal may be e.g. copper (or a copper-alloy), aluminum (or an aluminum-alloy) and/or stainless steel. The graphene metal composite provides increased wear resistance with tailored and improved conductivity.

Each braided strip 106, 108 is preferably arranged such the threads 116, 118, 120 of the braided strip 106, 108 extends essentially in the transverse direction T in relation to the longitudinal direction R of the electric road track 20.

Figure 3:
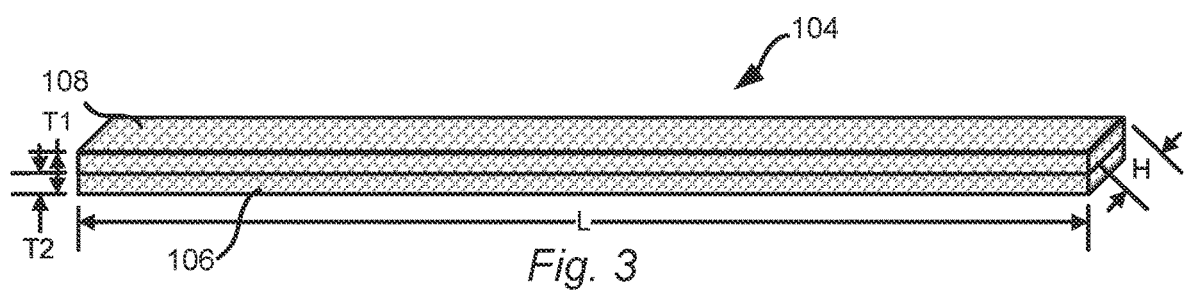
FIG. 3 discloses a perspective view of a conductive pick up.

Turning to FIG. 3 which shows a conductive pick up 104 comprising a laminate of a plurality of braided strips 106, 108. The laminate may comprise between 1 and 14 braided strips 106, 108, each braided strip 106, 108 forming a layer in the laminate.

The laminate shown in FIG. 3 may comprise a first braided strip 106 being made from a first conductive material and a second braided strip 108 being made from a second conductive material. The first conductive material may be stainless steel and the second conductive material may be copper and/or aluminum (or an alloy comprising copper and/or aluminum).

Alternatively, each strip 106, 108 may be manufactured from braided threads of different materials and/or of composite materials as described in conjunction with FIG. 2 in the foregoing.

As is illustrated in FIG. 3, a thickness T1 of the conductive pick up 104 may be in the range of 2 mm to 70 mm. For instance, in applications where the conductive pick up 104 is subjected to a lot of wear such as in the mining industry or other applications for heavy vehicles 10, having a larger thickness T1, i.e. between 50 and 70 mm, may be beneficial as this increases the amount of wear that can be withstood before the conductive pick up 104 needs to be replaced. In contrast, for a regular car, having a thickness T1 between 2 and 10 mm provides sufficient durability while not having to consume too much of the space available under the vehicle 10.

Each layer, i.e. each braided strip 106, 108, of the laminate may have a thickness T2 in the range of 1 mm to 10 mm. The thickness T1 of the conductive pick up 104 is preferably essentially equal to the sum of each respective thickness T2 of each of the braided strip 106, 108.

Further still, a height H of the conductive pick up 104 may be in the range of 10 mm to 70 mm. Similarly, as for the thickness T1, an increased height H provides a conductive pick up 104 that can withstand more wear, however on the cost of requiring more space underneath the vehicle 10. Application in which more wear is expected, such as for larger vehicles such as trucks or busses, may therefore be provided with a conductive pick up 104 having a height of between 50 mm to 70 mm while regular personal transport vehicles such as cars may be provided with a conductive pick up 104 having a height between 10 mm and 30 mm.

A length L of the conductive pick up 104 may be in the range of 20 cm to 100 cm.

While the conductive pick up 104 in FIG. 3 is shown having two layers, each layer comprising a respective braided strip 106, 108, the conductive pick up 104 may be provided with three or more layers in which each layer comprises a braided strip.

Figure 4:
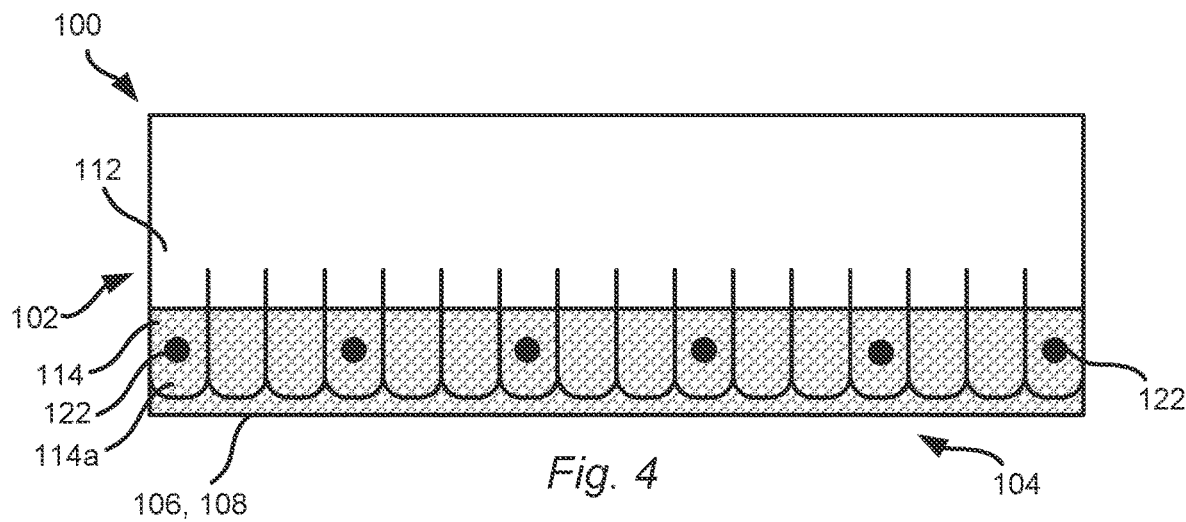
FIG. 4 discloses a front view of a contact member.

FIG. 4 illustrates a contact member 100 comprising a supporting structure 102 with a thereto attached conductive pick up 104. The contact member 100 is shown from the front side, i.e. the side which is intended to face the electric road track 20 and in the direction of travel of the vehicle 10. The conductive pick up 104 comprises a braided strip 106, 108, or a laminate of layered braided strips 106, 108. The supporting structure 102 shown further comprises a resilient member 112, the resilient member 112 facilitates resiliently providing a more even force application between the conductive pick up 104 and the electric road track 20. The resilient member 112 may be manufactured from a sheet material out of for instance spring steel. The spring steel may be formed from regular steel or from stainless steel.

In the embodiment shown in FIG. 4, the resilient member 112 is provided with tongues 114 to which the conductive pick up 104 is mounted. Having the conductive pick up mounted to the tongues 114 allows improvement in the resilient properties of the conductive pick up 104 and of its ability to follow the contour of the electric road track 20. Each tongue 114 is separate from the adjacent tongues 114 and the tongues 114 can thus move more or less independently of each other, facilitating improved capability of the conductive pick up 104 to adapt to the contour of the electric road track 20. The conductive pick up 104 is preferably mounted to distal ends 114a of the tongues 114. A larger contact surface area is thus achieved between the conductive pick up 104 and the electric road track 20, distributing the force and the friction over a larger surface area and improving electrical conduction.

Further illustrated in the embodiment shown in FIG. 4, the braided strip 106, 108, may be mounted to the support structure 102 by means of releasable mounting elements 122. The releasable mounting elements 122 may be for instance fasteners such as a screw and/or a nut, a rivet or another type of fastener suitable for attaching the braided strip 106, 108 to the support structure 102.

Figure 5:
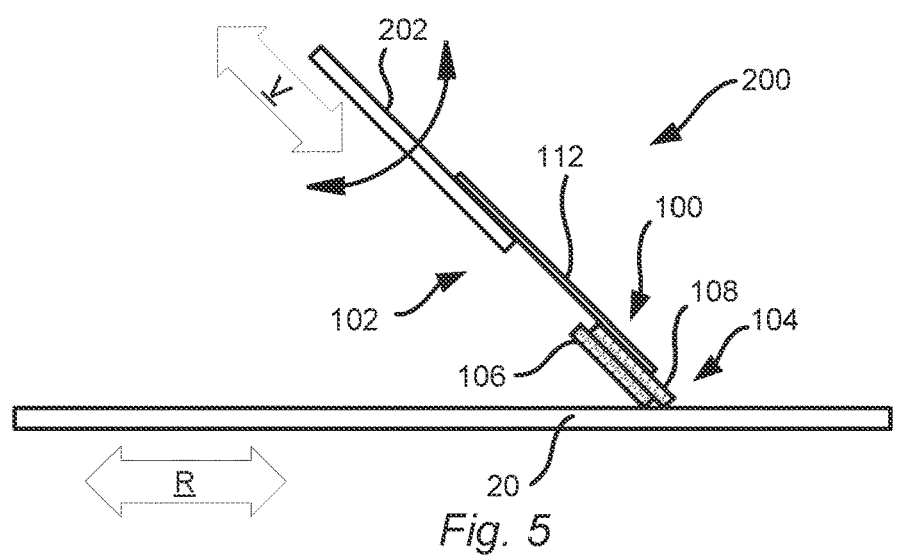
FIG. 5 discloses a side view of a power collector arranged in contact with an electric road track.

FIG. 5 shows a side view of a power collector 200 which is brought into contact with an electric road track 20, the contact member 100 being arranged sliding against the electric road track 20. The power collector 200, or at least the arm 202 thereof, may be pivotably moveable in relation to the vehicle 10 in order to bring the contact member 100 into and out of contact with the electric road track 20, as indicated by the curved arrow in FIG. 5.

As is further illustrated in FIG. 5, layers, i.e. braided strips 106, 108, of the laminate, can be arranged offset relative each other in a parallel direction, i.e. in the longitudinal direction R, to the electric road track 20. Preferably such that distal ends of the braided strips 106, 108 are arranged in the same horizontal level, i.e. such that each of the braided strips 106, 108 is arranged in contact with the electric road track 20 when the power collector 200 of the vehicle 10 draws electric power from the electric road track 20.

The offset braided strips 106, 108 can be arranged offset in the longitudinal direction V of the power collector 200, i.e. in a radial direction in relation to the pivot axis of the power collector 200. As the contact member 100 is configured to be arranged at an angle against the electric road track 20 when drawing electric power therefrom, the offset in the direction V results in that each of the braided strips 106, 108 is in contact with the electric road track 20 as the power collector 200 draws electric power therefrom, when the power collector 200 is arranged at an angle in relation to the electric road track 20.

FIG. 5 illustrates the contact member 100 comprising a pick up 104 having two layers, i.e. two braided strips 108. However, as is illustrated in FIG. 6, the pick up 104 may be provided with three or more layers, i.e. three or more braided strips 106, 108, which may be arranged offset as described in relation to FIG. 5.

Further still, applicable to all embodiments disclosed herein, the outermost arranged layer in the laminate of plurality of braided strips 106, 108 may be a first braided strip 106 comprising the first conductive material comprising stainless steel. In the context of the present disclosure, the outermost braided strip 106 is to be considered as the braided strip that is arranged farthest from the support structure 102 and/or first as seen from a movement direction of the electric vehicle 10. In FIGS. 5 and 6, the movement direction of the vehicle 10 is to the left in the figures which preferably also is in the forward direction of the vehicle 10. Consequently, the outermost arranged braided strip 106 is the braided strip 106 that will firstly encounter any dirt or debris that may be situated on the electric road track 20. Having a first braided strip 106 made from a material comprising stainless steel arranged outermost in the conductive pick up 104 improves the capacity of the conductive pick up 104 to withstand such conditions. Stainless steel provides a higher durability than copper or aluminum that are softer materials.

Figure 6:
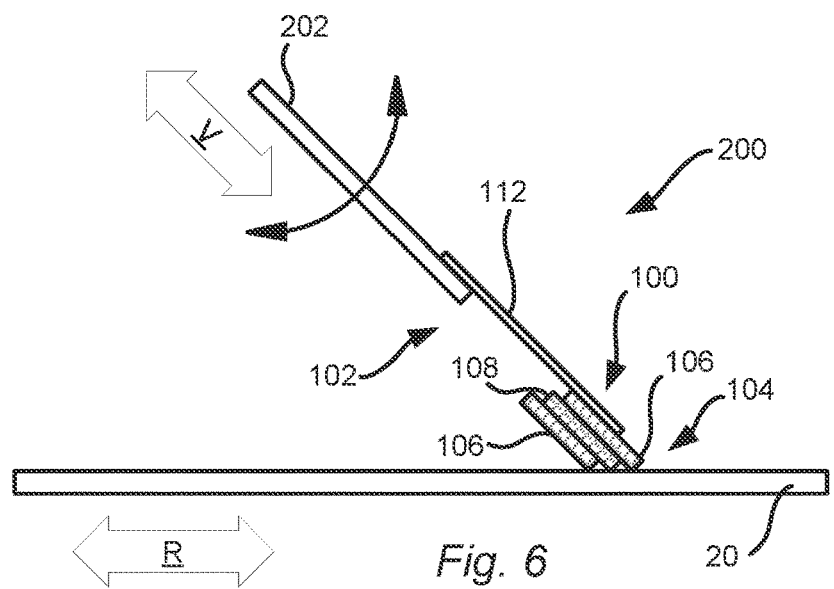
FIG. 6 discloses a side view of a power collector arranged in contact with an electric road track.

Moreover, the plurality of braided strips 106, 108 in the laminate may as is shown in FIGS. 5 and 6 comprise at least one first braided strip 106 and at least one second braided strip 108 which may be alternatingly arranged. The conductive pick up 104 is thus comprised of a plurality of braided strips 106, 108 where every other braided strip is a first braided strip 106 comprising stainless steel and every other braided strip is a second braided strip 108 comprising copper and/or aluminum. While the aforementioned is a preferred arrangement, other arrangements are however also considered. Such that for instance the outermost braided strip being a first braided strip 106 comprising the first conductive material comprising stainless steel. Thereafter may every third or fourth braided strip be a first braided strip 106 while the remaining braided strips in the laminate are second braided strips 108 comprising the second conductive material comprising copper and/or aluminum.

Figure 7:
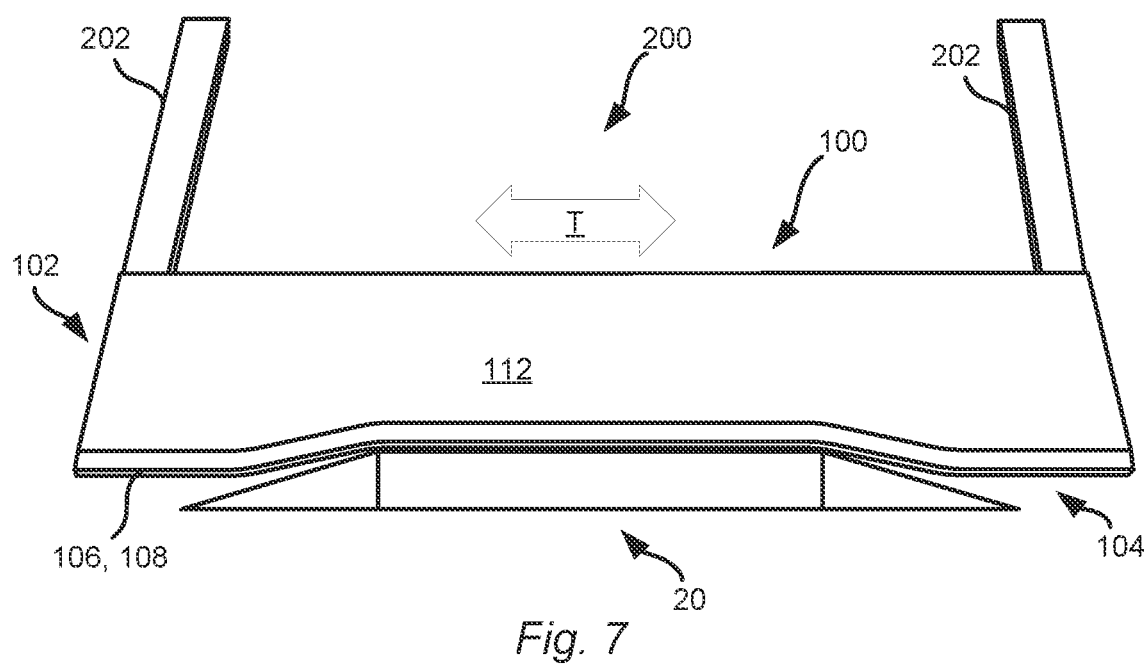
FIG. 7 discloses a rear view of a power collector arranged in contact with an electric road track.

FIG. 7 illustrates a front view of the power collector 200 comprising a contact member 100 provided with a resilient member 112. As shown, the resilient member 112 allows the contact member 100, specifically the conductive pick up 104, to flex by its contact with the electric road track 20. The resilience provided by the resilient member 112 facilitates establishing a reliable and large contact between the conductive pick up 104 and the electric road track 20.

The resilient member 112 in FIG. 7 is shown without tongues 114 but may, as is illustrated in FIG. 4, comprise a plurality of tongues 114, whereby the conductive pick up 104 preferably is mounted to distal ends 114a of the plurality of tongues 114.

The braided strips 106, 108 preferably has an extension in a transverse direction T in relation to the electric road track 20 from which the conductive pick up 104 is configured to conductively pick up electric power, the extension of the braided strips 106, 108 is preferably larger than the width of the electric road track 20.

The person skilled in the art realizes that the present invention by no means is limited to the preferred embodiments described above. On the contrary, many modifications and variations are possible within the scope of the appended claims. Additionally, variations to the disclosed embodiments can be understood and effected by the skilled person in practicing the claimed invention, from a study of the drawings, the disclosure, and the appended claims.

What is claimed is:

1. A contact member for a power collector of an electric road vehicle, the contact member being configured to be mounted to a first end of an arm of the power collector, the contact member comprising:
   a support structure; and
   a conductive pick up comprising a braided strip, the conductive pick up being mounted to the support structure, the braided strip of the conductive pick up being configured to establish contact with an electric road track for conductively picking up electrical power from the electric road track.

2. The contact member according to claim 1, wherein the braided strip has an extension in a transverse direction in relation to the electric road track from which the conductive pick up is configured to conductively pick up electric power.

3. The contact member according to claim 1, wherein the conductive pick up comprises a laminate of a plurality of braided strips.

4. The contact member according to claim 3, wherein a first braided strip of the braided strips in the laminate is made from a first conductive material and a second braided strip of the braided strips in the laminate is made from a second conductive material.

5. The contact member according to claim 4, wherein the first conductive material comprises stainless steel and the second conductive material comprises one or more of copper and aluminum.

6. The contact member according to claim 5, wherein a first braided strip is arranged outermost of the plurality of braided strips.

7. The contact member according to claim 3, wherein layers of the laminate are arranged offset relative each other in a parallel direction to the electric road track from which the conductive pick up is configured to conductively pick up electric power, wherein each layer of the laminate comprises one of the plurality of braided strips.

8. The contact member according to claim 3, wherein a thickness of each layer in the laminate is in the range of 1 mm to 10 mm.

9. The contact member according to claim 1, wherein threads in the braided strip of the conductive pick up comprises a composite material comprising a metal and graphene.

10. The contact member according to claim 1, wherein the braided strip of the conductive pick up comprises threads made from a first conductive material and threads from a second conductive material.

11. The contact member according to claim 10, wherein the first conductive material comprises stainless steel and the second conductive material comprises one or more of copper and aluminum.

12. The contact member according to claim 1, wherein the support structure comprises a resilient member and wherein the conductive pick up is mounted to the resilient member.

13. The contact member according to claim 12, wherein the resilient member is made out of spring steel.

14. The contact member according to claim 12, wherein the resilient member comprises a plurality of tongues, wherein the conductive pick up is mounted to distal ends of the plurality of tongues.

15. The contact member according to claim 1, wherein a thickness of the conductive pick up is in the range of 2 mm to 70 mm.

16. The contact member according to claim 1, wherein a height (H) of the conductive pick up is in the range of 10 mm to 70 mm.

17. The contact member according to claim 1, further comprising releasable mounting elements configured to releasably mount the braided strip to the support structure.

18. A power collector for an electric road vehicle, the power collector comprising:
an arm; and
a contact member mounted to a first end of the arm, the contact member comprises:
a support structure, and
a conductive pick up comprising a braided strip,
wherein the conductive pick up is mounted to the support structure, the braided strip of the conductive pick up is configured to establish contact with an electric road track for conductively picking up electrical power from the electric road track.

19. An electric vehicle comprising a power collector according to claim 18, wherein the power collector is mounted to a chassis of the electric road vehicle.

* * * * *